Jan. 19, 1937.  A. B. STITES  2,068,632
DIRECTION INDICATOR SWITCH
Filed Jan. 28, 1936
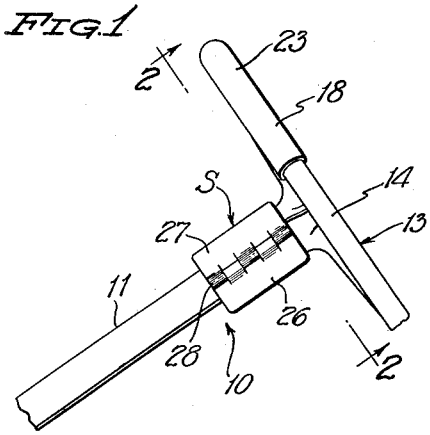
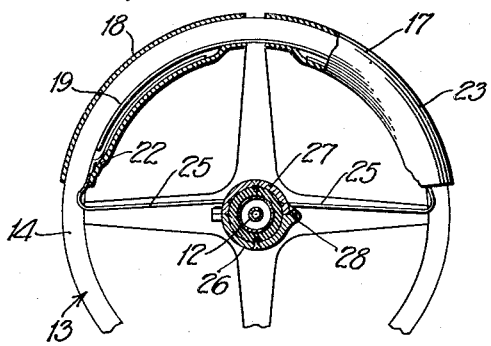
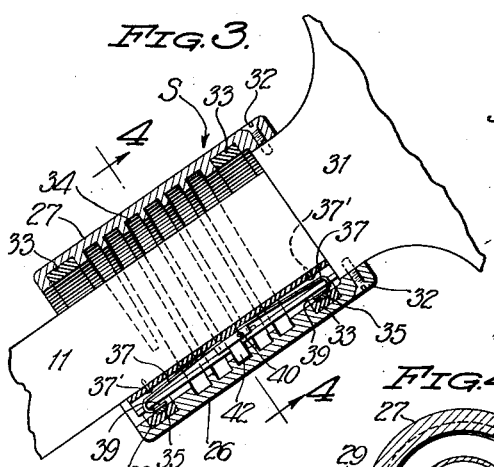
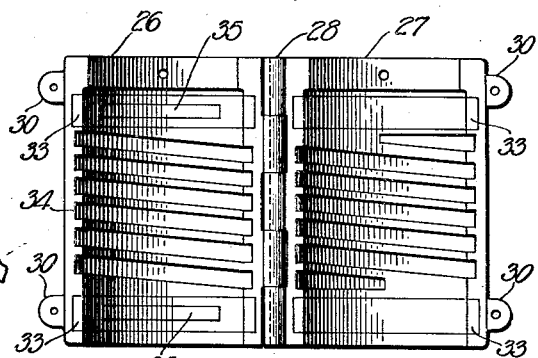
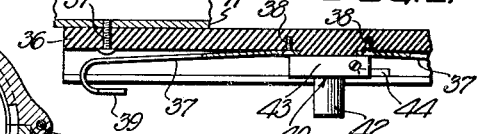
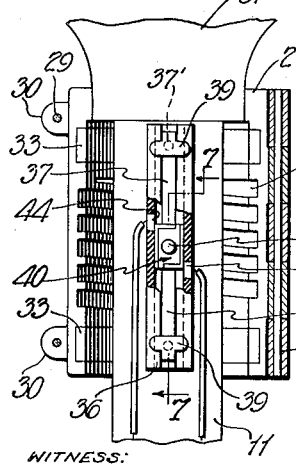
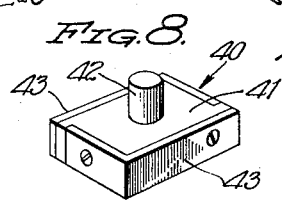
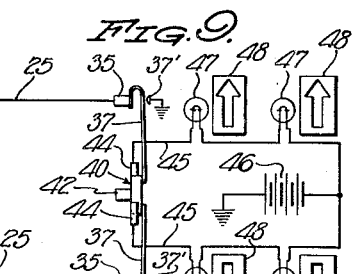
AMOS B. STITES.
INVENTOR.
BY Ely & Pattison.
ATTORNEYS.
WITNESS:

Patented Jan. 19, 1937

2,068,632

UNITED STATES PATENT OFFICE 2,068,632

DIRECTION INDICATOR SWITCH

Amos B. Stites, Plainfield, N. J.

Application January 28, 1936, Serial No. 61,129

2 Claims. (Cl. 200—59)

This application constitutes a continuation in part of my application Serial No. 677,982, filed June 28, 1933, and the invention relates to improvements in directional indicators for motor vehicles.

One of the main objects of the invention resides in a directional indicator, by the operation of which, the driver of a motor vehicle may operate a signal without removing his hands from the steering wheel or changing his grip thereon to forewarn drivers of other motor vehicles and pedestrians that the vehicle is about to make a right or a left turn.

Another feature of the invention is to provide a directional indicator which may be initially operated by manual actuation of the driver of a motor vehicle to display to others his intention to make a right or left turn, and which display signal is automatically maintained during the turning of the steering wheel when making the turn independently of the initial manually operated mechanism, until such time as the turn has been completed, after which the parts are returned to their normal positions.

Another important feature of the invention is to prevent operation of one of the signals during operation of the other signal to avoid confusion should an operator unintentionally actuate the control switch of the other signal.

A further object of the invention is the provision of an electrically operated right and left turn indicator for motor vehicles in which the initial manually operated control switch is mounted on the hand grip portion of the steering wheel at opposite sides thereof when the steering wheel is in neutral or straight steering position, so that the natural tendency of the driver to squeeze or grip the wheel on that side of the same in the direction of the intended turn will result in the closing of the proper signal circuit.

A further object is to provide a directional indicator which may be installed upon motor vehicles now in use without alterations in the construction thereof.

A still further object is the provision of a directional indicator embodying the above features which is simple of construction and installation, inexpensive of manufacture, and immediately responsive to the control of the operator of the vehicle on which it is installed.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a side elevational view of the control switches of the signalling system in position upon the steering mechanism of a motor vehicle.

Figure 2 is a transverse sectional view on the line 2—2 of Figure 1.

Figure 3 is an enlarged vertical longitudinal sectional view through the secondary control switch.

Figure 4 is a vertical transverse sectional view on the line 4—4 of Figure 3.

Figure 5 is a vertical longitudinal sectional view through the casing of the secondary control switch with parts broken away.

Figure 6 is a side elevational view of the switch casing in open position.

Figure 7 is an enlarged longitudinal sectional view on the line 7—7 of Figure 5.

Figure 8 is a detail perspective view of the switch button.

Figure 9 is a diagrammatic view of the electric signalling circuits.

Referring to the drawing by reference characters, the numeral 10 designates the steering control mechanism of a motor vehicle which includes a stationary steering column jacket or post 11 in which the steering tube 12 is enclosed, and which tube is turnable and carries a steering wheel 13 at the upper end thereof. The steering wheel 13 comprises an outer rim or hand ring 14, and spokes 15 of which extend radially from the hub 16 to the hand grip ring.

Mounted on the rim 14 of the steering wheel are right and left manual electric switches 17 and 18. In the drawing I have illustrated these switches as positioned at the top of the steering wheel when the said wheel is in a neutral or straight away driving position, although they may be positioned at the bottom of the wheel if desired. Each of the switches 17 and 18 is of an identical construction so that a description of one will suffice for the other. Each of the switches 17 and 18 includes a fixed contact 19 mounted on the inside of the rim 14 and which contact is grounded as at 20 in Figure 9 of the drawing. Normally spaced from the contact 19 is a resilient arcuate shaped spring contact 22. The resiliency of the contact 22 normally holds the same out of engagement with the contact 19 but is adapted to be manually engaged therewith to close a signalling circuit presently to be explained. Enclosing the contacts 19 and 22 and surrounding the rim 14 is a rubber sleeve or tube 23 which serves as a hand grip for the operator during the actuation of the two hand switches 17 and 18. The spring contacts 22 of the respective switches 17 and 18 are connected by one of the ends of wires 25, while the other ends of these wires are connected to contacts presently to be described. Mounted for turning movement with the steering wheel is a selective secondary switch S, the purpose of which is to maintain the signal in an "on" position after setting of a selected signal by the actuation of either of the hand switches 17 and 18, and which switch S serves to render one of the signals inoperative after the other signal has been set by the actuation of one of the hand switches on the steering wheel. The switch S includes a pair metal casing sections 26 and 27 which are hingedly connected together along one of their sides as at 28. The casing sections are fitted about the stationary post 11 and are held closed by screws 29 which pass through threaded openings in the ears or flanges 30 provided on the free side edges of the respective casing sections. The upper ends of the casing sections embrace the hub 31 of the steering wheel and are fastened thereto by screws 32. In this manner, the walls of the casing are disposed in spaced relation to the stationary post 11 and the said casing rotates with the hub 31 of the steering wheel. Each of the hinged casing sections adjacent their opposite ends thereof is provided with semi-circular shaped counter sunk rings of di-electric material and designated 33, while the inner wall of each casing section intermediate the rings 33 is formed with semi-circular shaped inclined screw threads 34 whereby when the two casing sections are in closed position a continuous spiral groove is provided for a purpose to be presently explained. Countersunk in the di-electric rings 33 of the casing section 26 are arcuate shaped contact strips 35 with which the wires 25 hereinbefore mentioned connect.

Fixedly secured to the steering post 11 and extending lengthwise thereof is a channel guide 36 constructed of dielectric material, the fastening means being in the form of screw contacts 37' which threads into the post 11. Two of these screw contacts 37' are provided, one at each end of the channel guide and as shown in Figure 9, the screw contacts are grounded.

A pair of flat resilient contacts 37 have their inner ends in spaced relation and are fastened to the base of the guide channel by screws 38. The free ends of the spring contacts 37 are bent upon themselves to provide hook shaped heads 39, the bill ends of the hook shaped heads normally bearing against the respective segmental contacts 35 as shown in Figure 3 of the drawing. The hook shaped heads extend beyond the plane of the guide channel, but the head ends of the spring contacts are free to be moved inwardly against their respective tensions to engage the ground contacts 37', the means for moving the spring contacts 37 into engagement with the respective screw contacts 37' will now be described.

Slidable lengthwise within the guide channel 36 is a switch member 40 which includes a rectangular shaped body 41 of dielectric material from one side of which a pin 42 extends. Fastened to opposite sides of the rectangular shaped body 41 are L-shaped contact members 43, which when the switch member is in normal position, respectively engage fixed contacts 44 mounted in opposite sides of the guide channel 36. The contacts 44 are staggered with respect to each other so that movement imparted to the switch member 40 in either direction will cause the switch member to break contact with one of the contacts 44 while maintaining contact with the other contact 44. From Figure 7 of the drawing, it will be noted that as the contact member 40 moves over one of the spring contacts 37, that the said contact 37 will immediately break connection with the segmental contact 35 and be caused to move into contacting engagement with the ground contact 37'.

The pin 42 extends into the continuous spiral groove formed within the casing by the semi-circular shaped groove 34 formed in the two casing sections.

Wires 45 lead from the respective fixed contacts 44 to one side of a battery 46, the other side of the battery leading to the ground. The respective wires 45 form part of two different circuits, that is, a right signaling circuit and a left signaling circuit. In each of the signaling circuits are arranged electric lamps 47 adapted to be arranged within signaling housings 48. Two signal lights have been shown in each circuit, one for the front of the vehicle and the other for the rear.

In operation of the signaling system hereinbefore described, assume that the parts are in neutral position as shown in the several figures of the drawing, and that an operator is desirous of displaying a signal to indicate that his motor vehicle intends to make a right turn. The operator grasps the right hand switch 17 on the steering wheel and by squeezing the same the contact 22 of the said switch is moved into contacting engagement with the fixed contact 19 thus closing the right signal circuit which is from ground to contact 19, contact 22, wire 25, segmental contact 35, spring contact 37, switch member 40, fixed contact 44, wire 45, lamps 47 of the right signaling devices, battery 46 to ground.

The operation just described is preparatory to the actual turning of the steering wheel 13 to effect turning of the vehicle and until the act of turning is accomplished, the operator must continue to grasp the switch 17, but upon turning the steering wheel to effect the turn and while still holding the switch 17, the spiral groove in the casing of the switch S causes the switch member 40 to move lengthwise of the guide track 36 which when making a right turn effects an upward movement of the switch member 40 which maintains contact with one of the fixed contacts 44, while breaking contact with the other contact 44. During this movement, the spring contact 37 over which the switch member 40 rides will be depressed to cause the head end 39 to move out of engagement with its related segmental contact 35 and into engagement with its related ground contact 37'. Thus the signal control from the switch on the steering wheel is broken, but the circuit to the signalling lamps is still closed and the completed circuit is from the ground contact 37', spring contact 37, contact 43 on the switch member 40, fixed contact 44, wire 45 of the right signalling circuit, lamp 47 of said circuit to the battery 46 and thence to ground. It will be noted that turning of the wheel in either direction renders both of the hand switches on the steering wheel inoperative, thus an operator after starting a turn cannot unintentionally give a misleading signal. The initial signal given upon actuation of the switches of the steering wheel are only effected in closing the respective circuits when the steering wheel is in a substantially straightforward driving position, or the hand switches may function to close the respective circuits until such time as the segmental contacts 35 are moved out of contacting engagement with the head ends 39 of the spring contact 37.

While I have shown and described what I consider to be the most practical embodiment of my invention, I wish it to be understood that such changes and modifications as come within the scope of the appended claims may be resorted to if desired.

Having thus described the invention, what I claim as new and desire to secure by Letters Patent of the United States, is:—

1. In an electric switch, a fixed channel guide, a pair of resilient spring contacts disposed in longitudinal alinement with their inner ends terminating in spaced relation and fixed to the bottom of said channel guide, a pair of offset contacts respectively disposed in opposite sides of said channel guide, a block member of di-electric material slidably mounted in said channel guide for sliding contact with said resilient spring contacts and normally disposed at the inner fixed ends thereof, a pin extending from said block member, a pair of spaced L-shaped bridge contacts on opposite sides of said block member to maintain a normal bridging of said spring contacts and the respective fixed contacts, fixed contacts at the ends of said channel guide with which the free ends of the spring contacts are adapted to engage, a cylindrical casing fixedly secured to a part to be turned, and a spiral groove provided on the inside of said casing into which said pin extends, whereby turning of said casing will cause said block member to engagingly depress either of said spring contacts to cause the free ends thereof to respectively contact with the fixed contacts at the ends of the guide channel.

2. In an electric switch, a fixed channel guide, a pair of resilient spring contacts disposed in longitudinal alinement with their inner ends terminating in spaced relation and fixed to the bottom of said channel guide, a pair of offset contacts respectively disposed in opposite sides of said channel guide, a block member of di-electric material slidably mounted in said channel guide for sliding contact with said resilient spring contacts and normally disposed at the inner fixed end thereof, a pin extending from said block member, a pair of spaced L-shaped bridge contacts on opposite sides of said block member to maintain a normal bridging of said spring contacts and the respective fixed contacts, fixed contacts at the ends of said channel guide with which the free ends of the spring contacts are adapted to engage, a cylindrical casing fixedly secured to a part to be turned, and a spiral groove provided on the inside of said casing into which said pin extends, segmental contacts on the inside of said cylindrical housing with which the free ends of said spring contacts normally engage, whereby turning of said casing will cause said block member to engagingly depress either of said spring contacts to cause the free ends thereof to be moved from engagement with said segmental contacts and into contacting engagement with the respective fixed contacts at the ends of said guide channel.

AMOS B. STITES.